(12) United States Patent
Peck et al.

(10) Patent No.: US 8,020,809 B2
(45) Date of Patent: Sep. 20, 2011

(54) DIRECT TORQUE ACTUATOR CONTROL FOR CONTROL MOMENT GYROSCOPE

(75) Inventors: Mason Peck, Ithaca, NY (US); William E. Bialke, Trumansburg, NY (US)

(73) Assignee: Ithaco Space Systems, Inc., Ithaca, NY (US)

( * ) Notice: Subject to any disclaimer, the term of this patent is extended or adjusted under 35 U.S.C. 154(b) by 824 days.

(21) Appl. No.: 12/148,467

(22) Filed: Apr. 18, 2008

(65) Prior Publication Data

US 2009/0001220 A1    Jan. 1, 2009

Related U.S. Application Data

(60) Provisional application No. 60/925,073, filed on Apr. 18, 2007.

(51) Int. Cl.
*B64G 1/28* (2006.01)
(52) U.S. Cl. .......................... 244/165; 74/5.47
(58) Field of Classification Search .................. 244/165; 74/5.34, 5.4, 5.47, 5.6 D
See application file for complete search history.

(56) References Cited

U.S. PATENT DOCUMENTS

| 5,386,738 | A | 2/1995 | Havenhill |
| 5,875,676 | A * | 3/1999 | Bailey et al. ................... 74/5.22 |
| 6,340,137 | B1 * | 1/2002 | Davis et al. ................... 244/165 |
| 6,417,798 | B1 | 7/2002 | Joerck et al. |
| 6,439,510 | B1 | 8/2002 | Barde et al. |
| 6,681,649 | B2 * | 1/2004 | Davis et al. ................... 74/5.47 |
| 6,685,142 | B1 | 2/2004 | Fichter et al. |
| 6,745,984 | B2 | 6/2004 | Defendini et al. |
| 7,185,855 | B2 | 3/2007 | Peck |
| 7,249,531 | B2 | 7/2007 | Defendini et al. |

* cited by examiner

*Primary Examiner* — Tien Dinh
*Assistant Examiner* — Michael Kreiner
(74) *Attorney, Agent, or Firm* — Scott D. Wofsy; Edwards Angell Palmer & Dodge LLP

(57) ABSTRACT

A control moment gyroscope system for delivering a target torque to a spacecraft including a rotor assembly having a rotor and a motor to spin the rotor about a rotor axis. A gimbal assembly has a gimbal for supporting the rotor assembly and a gimbal torque motor to rotate the gimbal about a gimbal axis, which is normal to the rotor axis, to generate an output torque. A control system has a sensor for determining the output torque and a processor in communication with the rotor assembly, the gimbal assembly and the sensor. The processor requests the target torque and establishes a feedback control loop to generate a torque error signal based on the output torque for bringing the output torque within a predetermined range of the target torque.

15 Claims, 6 Drawing Sheets

DIRECT TORQUE ACTUATOR CONTROL FOR CONTROL MOMENT GYROSCOPE

CROSS-REFERENCE TO RELATED APPLICATION

This application claims priority to U.S. Provisional Patent Application No. 60/925,073, filed Apr. 18, 2007, which is incorporated herein by reference.

BACKGROUND OF THE INVENTION

Control moment gyroscopes (CMGs) are well known means of providing directional control of spacecraft. One example is described in U.S. Pat. No. 5,386,738 to Havenhill, the disclosure of which is incorporated herein by reference in its entirety. CMGs typically include a rotor, a motor to spin the rotor about a rotor axis, a gimbal, a gimbal torque motor to rotate the gimbal about a gimbal axis and a control system. The control moment gyroscope is mounted within the spacecraft along the axis in which torque will be induced. The rotor is mechanically supported in the gimbal and is rotated about the gimbal axis, which is normal to the rotor axis.

During operation of the CMG, the rotor is spun about its rotor axis by a motor at a predetermined rate. In order to induce a torque on the spacecraft, the gimbal torque motor rotates the gimbal and spinning rotor about the gimbal axis. The rotor is of sufficient mass and is spinning at such a rate that any movement of the rotor out of its plane of rotation will induce a significant torque around an output axis, which is normal to both the rotor axis and the gimbal axis. Torque around the output axis is transferred directly to the spacecraft through a support structure.

Typical CMGs provide torque in response to a gimbal-rate command, which neglects gimbal dynamics. Because of imperfections in sensing and actuation, commanding a gimbal rate does not result in the output torque desired but, rather, a close approximation thereof. Improving the match between desired and actual output torque requires high-precision tachometers, which represent considerable cost and are likely impractical for the desired very small CMGs.

The spacecraft has an attitude control system which may employ one or more CMGs. The bandwidth of the gimbal-rate control loop (typically about 20 Hz for using gimbal rate as feedback) represents an upper bound on the spacecraft agility by limiting the bandwidth of the attitude control system.

SUMMARY OF THE DISCLOSURE

The subject technology provides a more suitable solution to improve the responsiveness of a control moment gyroscope and, in turn, an attitude control system using the same.

The subject technology also provides an improved match between desired and actual output torque of a control moment gyroscope. One embodiment measures three axes of torque, i.e. a vector T. By adjusting T using gimbal motion, only a single degree of freedom (i.e., some mathematical combination of all three components, e.g. a scalar) can be governed. The single degree of freedom is projected onto an arbitrary axis called the output axis along which substantially all of the torque lies. Thus, by using at least 3 such control moment gyroscopes, and consequently at least 3 gimbal motors, the full vector torque represented by the sum of these 3 torque vectors can be controlled.

In accordance with the subject technology, rather than actuating the gimbal directly, in response to a rate command, the direct-torque actuated control moment gyroscope disclosed herein senses output torque in three axes through a suite of load cells and closes a high-bandwidth control loop to deliver the desired torque to the spacecraft. The output torque is still roughly proportional to gimbal rate. However, because the control moment gyroscope's gimbal torque determines the rate of change in this output torque, the feedback control can be based on an unconditionally stable (i.e., 90° phase margin, infinite gain margin) feedback of output torque error to gimbal input torque. Other feedback schemes are also possible.

In one aspect of the subject technology, a control moment gyroscope uses up to six axis of force/torque measurements to generate a feedback signal for driving a measured output torque to a desired value. Preferably, the control moment gyroscope uses at least three linearly independent axes of measurements corresponding to the output-torque vector components.

Further, to measure only that portion of output torque in a plane perpendicular to the gimbal axis, at least two measurements are utilized for feedback.

The subject technology also may alleviate the need to precisely measure the gimbal spin rate. Only gimbal angle and the torque measurements are required, and the gimbal angle information is used simply to align the torque measurement mathematically with the output axis. As a result, the control system can be reduced to a single-input, single-output problem.

Utilizing direct torque feedback for control moment gyroscopes in accordance with the subject technology offers numerous advantages for a spacecraft attitude control system. For example, in small, high-speed control moment gyroscopes, the advantages include dispensing with tachometers, actively eliminating gimbal-angle dependencies in the output torque, and even estimating high-order alignment parameters. Further, additional high-bandwidth channels of output from the force sensors can provide in-situ measurement of induced vibration during thermal vacuum testing, and possibly on-orbit for diagnostics.

One embodiment of the subject technology provides a control moment gyroscope array for a spacecraft including at least three control moment gyroscopes, each control moment gyroscope mounted to the spacecraft structure and generating an output torque vector, which can include components in three linearly independent directions. A sensor for each control moment gyroscope determines a respective measured torque vector. A controller commands the at least three control moment gyroscopes to provide a desired torque vector as the vector sum of these three and receives the measured torque vector. The controller is operative to determine a vector torque error signal based on the measured torque vector and the desired torque vector such that the torque vector error signal is used to make the output torque vector substantially equal to the desired torque vector.

Another embodiment of the subject technology is a method for commanding a control moment gyroscope comprising the steps of determining calibration information to establish the angle-dependent torque associated with the control moment gyroscope, adjusting a command torque by the angle-dependent torque, providing the adjusted command torque to the control moment gyroscope, monitoring an output torque of the control moment gyroscope, and providing feedback to the control moment gyroscope based on the adjusted command torque and the output torque.

These and other features of the direct torque actuator control system of the subject invention and the manner in which they are employed in a spacecraft will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the direct torque actuator control system of the subject invention without undue experimentation, preferred embodiments thereof will be described in detail hereinbelow with reference to certain figures, wherein.

DETAILED DESCRIPTION OF THE INVENTION

Figure 1:
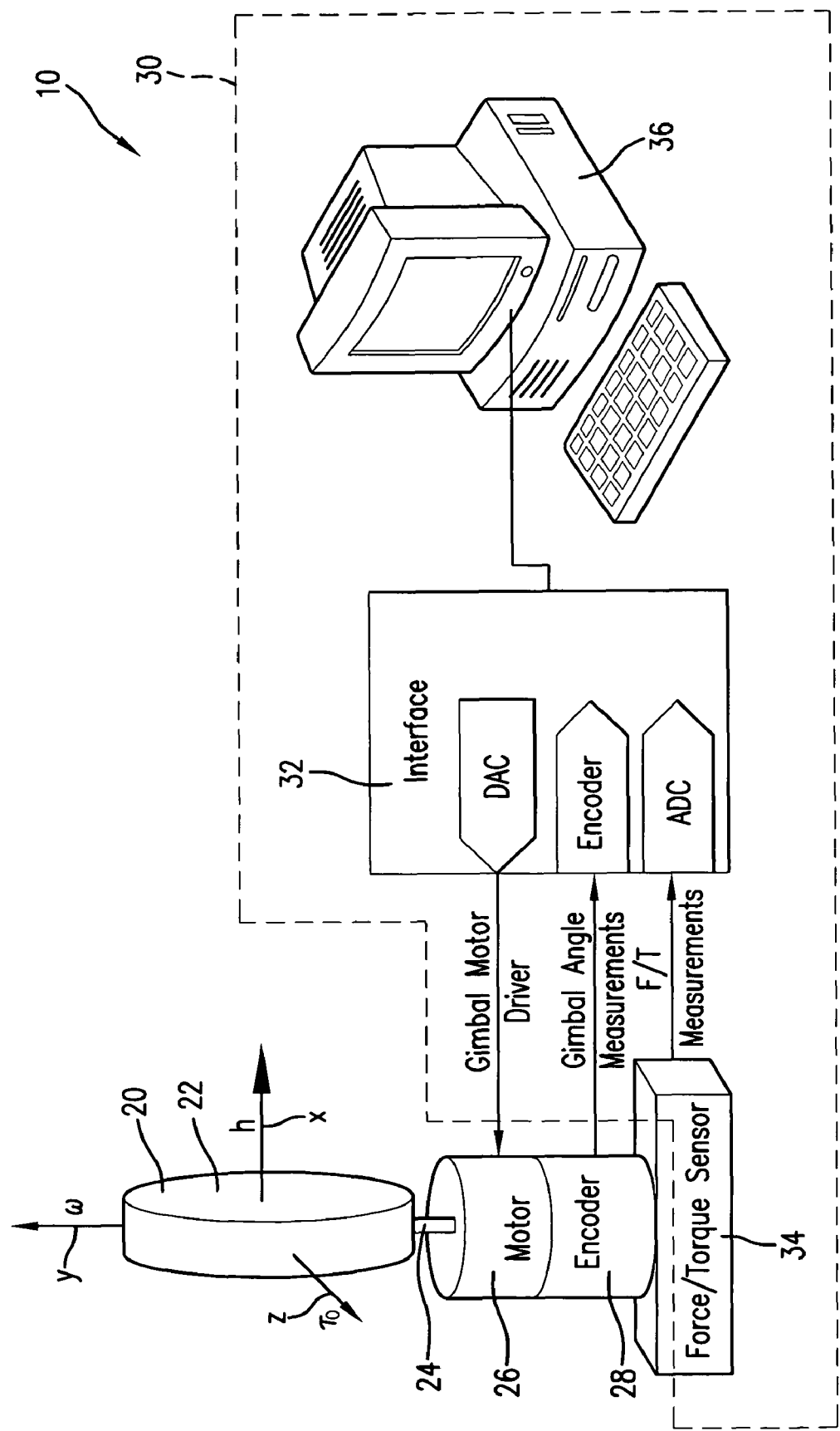
FIG. 1 is a schematic view of a control moment gyroscope (CMG) configured with a direct-torque actuator control system (DTACS) in accordance with the subject technology.

The present invention overcomes many of the prior art problems associated with control moment gyroscopes. The advantages, and other features of the control moment gyroscopes disclosed herein, will become more readily apparent to those having ordinary skill in the art from the following detailed description of certain embodiments taken in conjunction with the drawings which set forth representative embodiments of the present invention and wherein like reference numerals identify similar structural elements.

Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Figure 2:
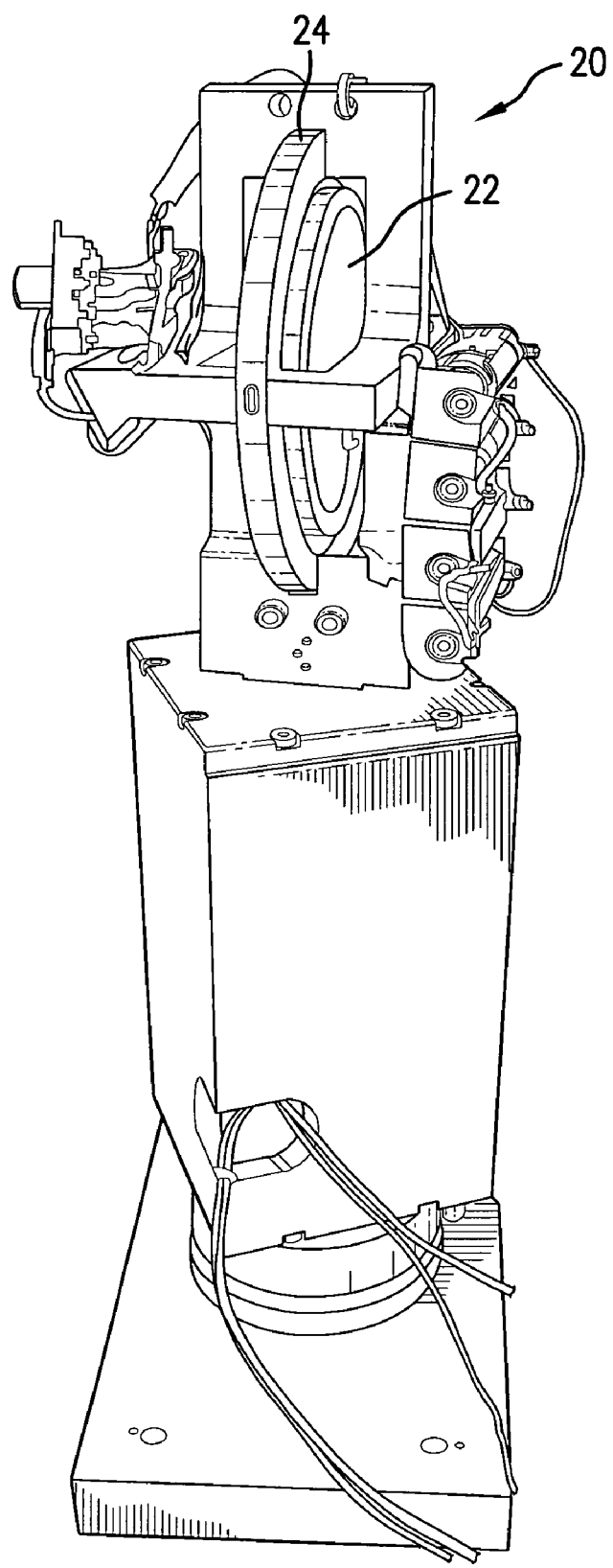
FIG. 2 is a perspective view of a CMG configured for operation with DTACS in accordance with the subject technology.

Referring to FIG. 1, a schematic view of a system 10 with a control moment gyroscope (CMG) 20 configured for use with a direct-torque actuator control system (DTACS) 30 is shown. The DTACS 30 includes an interface board 32 for communicating with the CMG 20. The CMG 20 may have a rotor assembly 22 and a gimbal assembly 24 as shown in FIG. 2, which is a perspective view of a CMG configured for operation with DTACS in accordance with the subject technology.

The DTACS 30 provides torque commands to a motor 26 of the gimbal assembly 24 under closed loop control. The CMG 20 also includes an encoder 28 for monitoring the angular position of the gimbal motor 26. As the gimbal motor 26 moves the gimbal assembly 24, the system 10 outputs a desired torque along an output axis "z", which is normal to the rotor axis "x" and gimbal axis "y". Preferably, the gimbal motor 26 and encoder 28 are a single assembly.

The DTACS 30 also generates signals from force/torque (F/T) sensors 34 mounted on the gimbal assembly 24 to determine the torque output by the system 10 as well as the forces experienced by the system 10. Typically, the F/T sensors 34 are one or more load cells. The DTACS 30 has a controller 36 for generating the gimbal motor drive commands. The controller 36 also uses the force/torque measurements to monitor the system 10 and generate corrective commands in real time. Preferably, the F/T sensors 34 are mounted between the CMG basering (not shown) and the spacecraft bus structure (not shown). Although graphically shown as a standard desktop computer, the controller 36 may be quite different such as electronics integral with the mechanical components. Additionally, the controller 36 may be separate and perform many other functions.

System Torque

Still referring to FIG. 1, the CMG 20 produces a torque $\tau_o$ along the output axis, approximately a combination of "y" and "z" of the system 10, such that approximately $$\tau_o = -\omega_{gimbal} \times h_{rotor}.$$

This output torque $\tau_o$ also includes terms not shown here, such as effects due to the gimbal acceleration, dynamic imbalance of the gimbaled hardware, and other imperfections. The F/T sensors 34 can measure this torque vector in three axes. When configured to control only the torque along this output axis, the F/T sensors 34 allow constructing the output torque $\tau_o$ based upon an absolute gimbal angle along with the torque components perpendicular to the gimbal spin axis "y", such that $$\tau_o = \tau_x \cos\theta + \tau_y \sin\theta$$

assuming $\Theta=0$ to be axially aligned with the F/T sensor 34. Preferably, the reference is reset whenever the system 10 is reprogrammed or powered down. For control action, only the magnitude of the output torque along the output axis "z" may be required. In one embodiment, the resultant scalar torque of the DTACS 30 can be given by:

$$\tau_{o,control} = \text{sign}(\omega_{gimbal}) \cdot \sqrt{\tau_x^2 + \tau_y^2}.$$

Calibration

In certain applications, mass properties offsets or other irregularities may create angle-dependent and constant disturbance torques. Such torques can be calibrated out of the measurement prior to being used for control. For example, the gimbal assembly 24 and the rotor assembly 22 may not be perfectly balanced. For another example, uneven mass distribution in the rotor assembly 22 may create a sinusoidal torque having the same frequency as the gimbal rotation frequency.

In order to help characterize the performance and calibrate the system 10, first, second and third order models as well as higher orders may be utilized. Preferably, a second order model is used to provide sufficient accuracy at a minimum level of complexity. The second order model also removes any constant bias such as from the torque measurements. Additional filtering may also improve performance. For example, $8^{th}$ order Butterworth low-pass filters with a cutoff frequency of 200 Hz can be used on raw x and y torque measurements to remove noise from the data.

In one embodiment, calibration of the F/T sensors 34 is utilized for angle-dependent torque effects present in the system 10. To calibrate the F/T sensors 34, a number of different positional readings are taken as the gimbal assembly 24 rotates to effectively measure the angle-dependent torque effect. Preferably, each positional reading includes the encoder position, the x torque and the y torque for storage. A pseudo-inverse approach can be used to find a least square solution from the readings to fit coefficients to the following Fourier series expansion:

$$\tau_{bias}(\theta) \approx \alpha_0 + \alpha_1 \cos\theta + \alpha_2 \sin\theta + \alpha_3 \cos 2\theta + \alpha_4 \sin 2\theta.$$

The coefficients from the Fourier series expansion are then stored so that the corresponding angle dependent torque can be subtracted from the measured torque at every angle.

System Control

Figure 3:
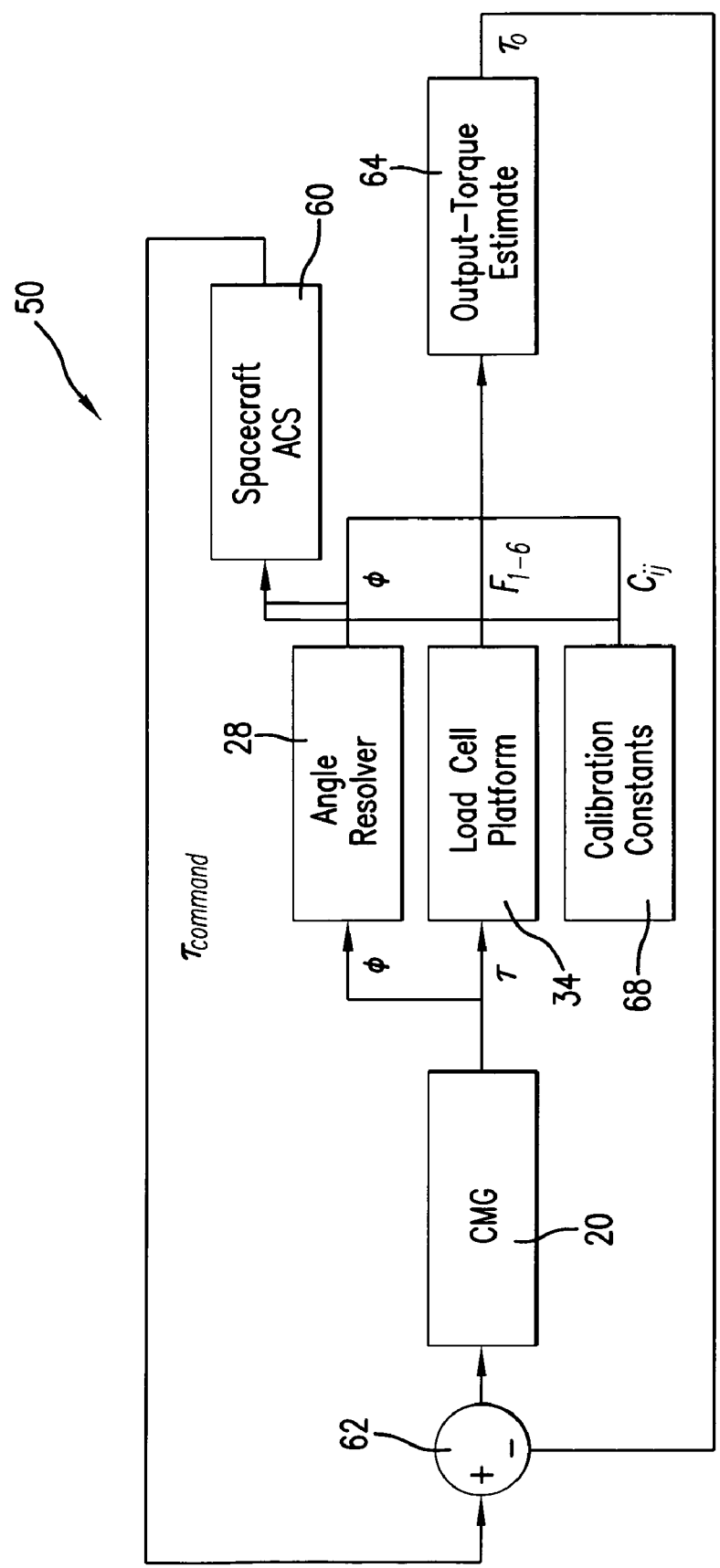
FIG. 3 is a schematic diagram illustrating a high-bandwidth control loop in accordance with the subject invention for delivering the desired torque to the spacecraft.

Referring now to FIG. 3, a schematic diagram illustrating a high-bandwidth control loop function 50 for delivering a desired output torque to a spacecraft is shown. Although the spacecraft is not shown, the spacecraft's attitude control system (ACS) 60 is shown as providing a commanded torque $\tau_{command}$ or $\tau_{cmd}$ to a summing junction 62. It is envisioned that the necessary components of the spacecraft ACS 60 and summing junction 62 could be integral with the controller 36.

In brief overview, the spacecraft ACS 60 provides a commanded torque $\tau_{cmd}$ to the CMG 20. The load cells or F/T sensors 34 generate a signal indicative of the actual torque $\tau$ generated by the CMG 20. The signals from the F/T sensors 34 are calibrated based on calibration constants 68. For example, the calibration constants can be derived from reading the encoder 28 (i.e., an angular position of the gimbal assembly 24) during a calibration routine as noted above. As a result, an output-torque estimate module 64 of the controller 36 generates a measured torque $\tau_o$ very accurately. The difference between the requested or commanded torque $\tau_{cmd}$ and the measured torque $\tau_o$ yields an error signal, which corrects the action of the system 10.

In one embodiment, the load cell or F/T sensors 34 may not output torque directly. If so, a high-bandwidth control loop function 50 can be used to relate load-cell measurements from the F/T sensors 34 to the output torque $\tau$ of the CMG 20. The control loop function 50 is derived in the following manner. First, the 3×1 vector force $F_i$ in an $i^{th}$ single-degree of freedom is represented as $$F_i = F_i \hat{f}_i,$$

where $F_i$ is the scalar force along the single-degree of freedom's unit vector $\hat{f}_i$. The net force F acting on the CMG 20 as measured by the respective F/T load sensor 34 is $$F = \sum_{i=1}^{6} F_i = [\hat{f}_1 \ \ldots \ \hat{f}_6] \begin{bmatrix} F_1 \\ \vdots \\ F_6 \end{bmatrix}.$$

If the relative orientation of the CMG 20 is taken to be constant, under the assumption that the deflections in the respective F/T load sensor 34 and supporting structure are negligible, the directions $\hat{f}_i$ never change and simply represent pre-computed calibration data based on the assumption that there are only three respective F/T load sensors 34 and that the respective F/T load sensors 34 measure $F_1$, $F_2$, and $F_3$. Other forces may be internal to the supporting structure but not measured directly so that solving for the forces begins with the assumption that the net force F is known. For example, with a demonstration unit in 1 g, the net force F is represented as $$F = mg,$$

where g is the vector acceleration due to gravity in the coordinate system of the system 10, likely 9.81 m/s².

More generally, the vector acceleration involves the angular velocity and acceleration of the spacecraft and depends on the location of the CMG's mass center relative to the spacecraft's. In any case, the unknown forces can be solved for in terms of the known ones:

$$\begin{bmatrix} F_4 \\ \vdots \\ F_6 \end{bmatrix} = [\hat{f}_4 \ \ldots \ \hat{f}_6]^{-1} \left( F - [\hat{f}_1 \ \ldots \ \hat{f}_3] \begin{bmatrix} F_1 \\ \vdots \\ F_3 \end{bmatrix} \right).$$

The net torque $\tau$ acting on the CMG 20 is $$\tau = \sum_{i=1}^{6} r_i \times F_i = [r_1 \times \hat{f}_1 \ \ldots \ r_6 \times \hat{f}_6] \begin{bmatrix} F_1 \\ \vdots \\ F_6 \end{bmatrix}.$$

In terms of only the known forces, $$\tau = [r_1 \times \hat{f}_1 \ \ldots \ r_6 \times \hat{f}_6] \begin{bmatrix} 1 & 0 & 0 \\ 0 & 1 & 0 \\ 0 & 0 & 1 \\ -[\hat{f}_4 \ \ldots \ \hat{f}_6]^{-1}[\hat{f}_1 \ \ldots \ \hat{f}_3] \end{bmatrix} \begin{bmatrix} F_1 \\ \vdots \\ F_3 \end{bmatrix} + c,$$

where c is a term that depends on the net force on the CMG. For the 1 g demonstration unit, the term c is constant at $$c = [r_1 \times \hat{f}_1 \ \ldots \ r_6 \times \hat{f}_6] \begin{bmatrix} 0 \\ 0 \\ 0 \\ [\hat{f}_4 \ \ldots \ \hat{f}_6]^{-1} mg \end{bmatrix}.$$

For the case of a CMG 20 in a spacecraft with arbitrary attitude dynamics given by an angular velocity $\omega$ and an angular acceleration $\alpha$, $$c = [r_1 \times \hat{f}_1 \ \ldots \ r_6 \times \hat{f}_6] \begin{bmatrix} 0 \\ 0 \\ 0 \\ [\hat{f}_4 \ \ldots \ \hat{f}_6]^{-1} m(a \times R + \omega \times \omega \times R) \end{bmatrix},$$

where R is the location of the CMG mass center relative to the spacecraft mass center. The result above assumes that no significant forces are acting on the spacecraft, which is a reasonable assumption unless thrusters are firing.

The DTACS 30 of the system 10 functions to control the scalar torque $\tau_o$ along the output axis "z" of the CMG 20 by using an output-torque estimate module 64 where, $$\tau_o = \hat{\delta}^T \tau,$$

where $\hat{\delta}^T$ is a row vector representing the output-axis unit vector. The output-axis unit vector is perpendicular to both the rotor's spin axis $\hat{h}$ and to the gimbal axis $\hat{\omega}$:

$$\hat{\delta} = -\hat{\omega} \times \hat{h}.$$

The output-axis unit vector can be expressed in terms of the gimbal angle (measured by an encoder relative to some arbitrary reference), for example the x operational axis:

$$\hat{\delta}^T = [\cos \theta \ \sin \theta \ 0].$$

So, the resulting scalar torque is $$\tau_o = \tau_x \cos \theta + \tau_y \sin \theta,$$

where $$\tau = \begin{bmatrix} \tau_x \\ \tau_y \\ \tau_z \end{bmatrix}.$$

The high-bandwidth control loop function 50 also includes an angle resolver module 66 and a calibration constants module 68 to help ascertain the scalar torque $\tau_o$ as noted above. It is envisioned that the output-torque estimate module 64, the resolver module 66 and calibration constants module 68 could also be integral with the controller 36.

System Dynamics

Figure 4:
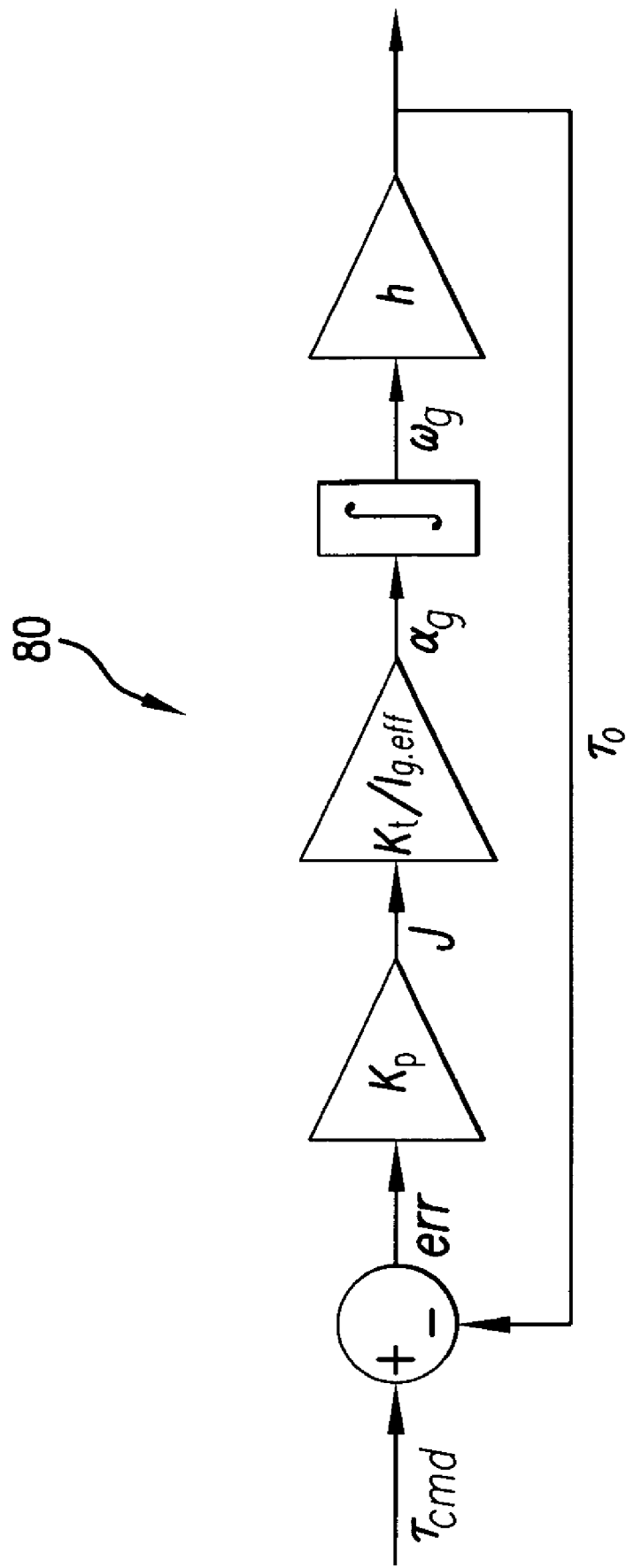
FIG. 4 is a control block diagram of a direct torque actuator control in accordance with the subject invention.

Referring now to FIG. 4, a control block diagram 80 in accordance with the system 10 is shown. The DTACS 30 for the system 10 accelerates the gimbal motor 26 in proportion to the error signal, which is the difference between the commanded torque $\tau_{cmd}$ and the measured torque $\tau_o$, which is a calibration adjusted value of the measured output torque $\tau$. It is assumed that the gimbal-motor torque $\tau_g$ depends directly on the current J with a motor torque constant $K_t$, $$\tau_g = K_t J.$$

Also, the gimbal rate $\omega_g$ is determined by the effective gimbal inertia, $I_{g,eff}$:

$$I_{g,eff} = I_g + \frac{h^2}{K_o},$$

in terms of the output-axis stiffness $K_o$. By using a feedback law of $$J = K_p(\tau_{cmd} - \tau_o),$$

where $\tau_{cmd}$ is the commanded torque along the output axis "z" and $K_p$ is a control gain. Since the gimbal acceleration is given by $$\alpha_g = \frac{K_t J}{I_{g,eff}}$$

and the output torque $\tau_o$ in terms of the gimbal rate $\omega_g$ and the rotor momentum h is $$\tau_o = \omega_g h = \frac{1}{s} \alpha_g h,$$

the closed-loop equation of motion is $$\tau_o = \frac{1}{s} \frac{K_t K_p h}{I_{g,eff}} (\tau_{cmd} - \tau_o).$$

Upon review of the closed-loop equation, the system 10 is unconditionally stable with an infinite gain margin and 90° of phase margin. The system 10 responds with a time constant T of $$T = \frac{I_{g,eff}}{K_t K_p h}.$$

Selecting the gain $K_p$ is a matter of accommodating a settling-time requirement:

$$K_p = \frac{I_{g,eff}}{K_t T h}$$

In one embodiment, in which the gimbal rate-control bandwidth is about 20 Hz, the parameter T is chosen so that the settling time comes from one quarter of a 20 Hz wave: T=0.07854 sec. For a CMG with h=20 Nms, gimbal inertia $I_g$=0.6 kgm², output-axis stiffness $K_o$=10,000 Nm/rad, and a torque constant $K_t$=0.1 Nm/A, the control gain is roughly $K_p$=4.1.

In practice, flexible effects and delay in the motor current loop ought to be taken into account. Noise amplification ought to be considered as well and may lead to another pole in the compensation design to roll off high frequencies. However, a first-order approach may be used if the mechanical system is sufficiently stiff and the motor driver sufficiently responsive.

In sum, the DTACS 30 of the system 10 provides a single-axis gimbal 24 with six degree of freedom F/T sensors 34 between the CMG 20 and a spacecraft controller 36 to generate gimbal-angle measurements that provide an estimate of the output-torque direction. The F/T sensors 34 provide measurements that are fed back to the gimbal-motor current for closed-loop control of the scalar output torque along the output axis "z".

In an alternate embodiment of the subject invention, piezoelectric actuators are used for high-bandwidth compensation of disturbances above the gimbal bandwidth. In yet another embodiment, the system is employed with a scissored pair of CMGs with six degree of freedom F/T sensors or both sensors and actuators between the gimbal-mounting structure and the spacecraft bus structure. The scissored pair of CMGs can be employed as a drop-in replacement for a typical high-torque CMG.

Strut CMG

Figure 5:
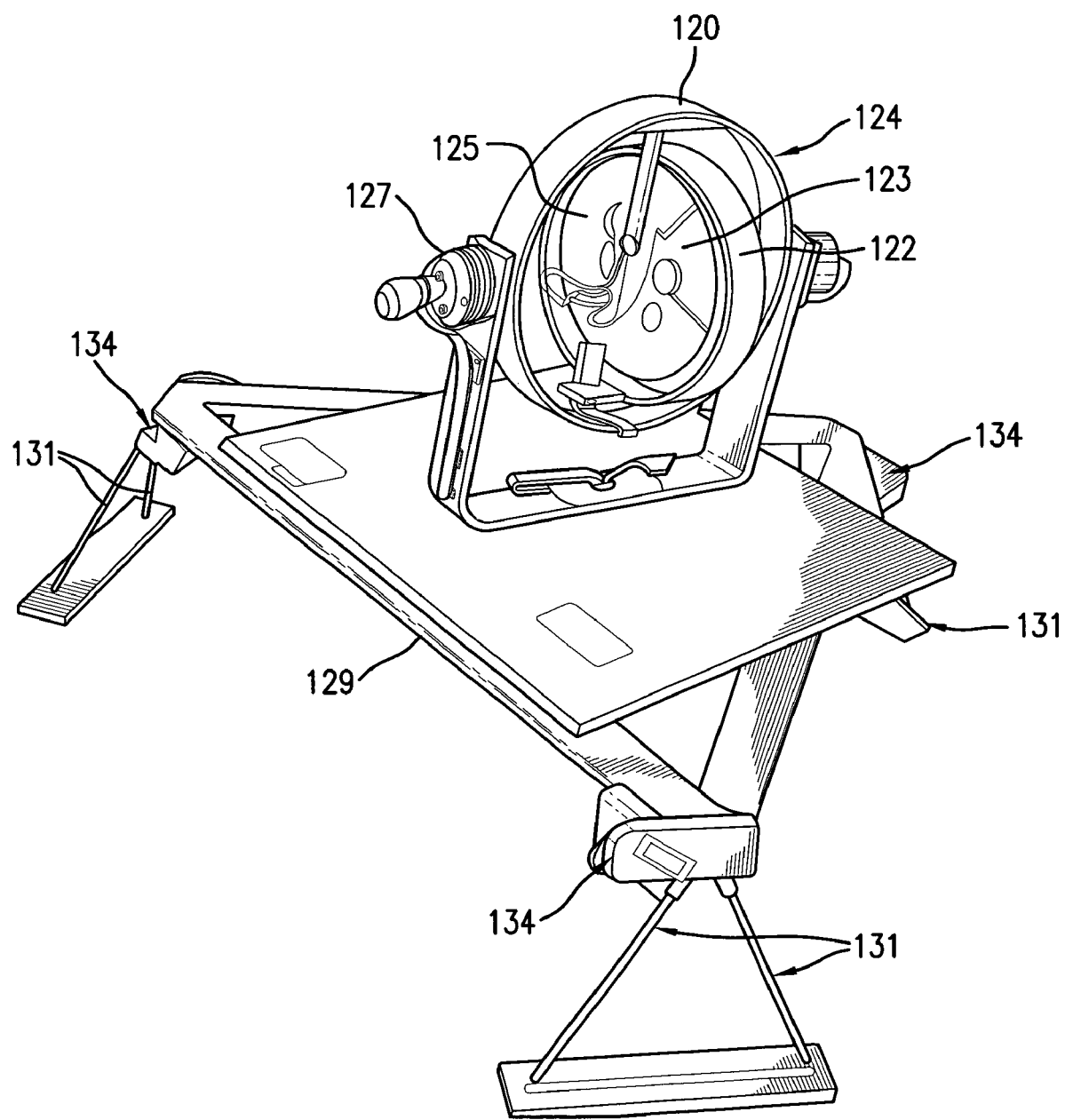
FIG. 5 is a perspective view of a CMG configured with a DTACS using single-axis struts in accordance with the subject technology.

Referring to FIG. 5, a perspective view of another system 100 using a CMG 120 configured with a DTACS 130 is shown. As will be appreciated by those of ordinary skill in the pertinent art, the system 100 utilizes similar principles to the system 10 described above. Accordingly, like reference numerals preceded by the numeral "1" are used to indicate like elements. The primary difference of the system 100 in comparison to the system 10 is the method of mounting the CMG 120.

Figure 6:
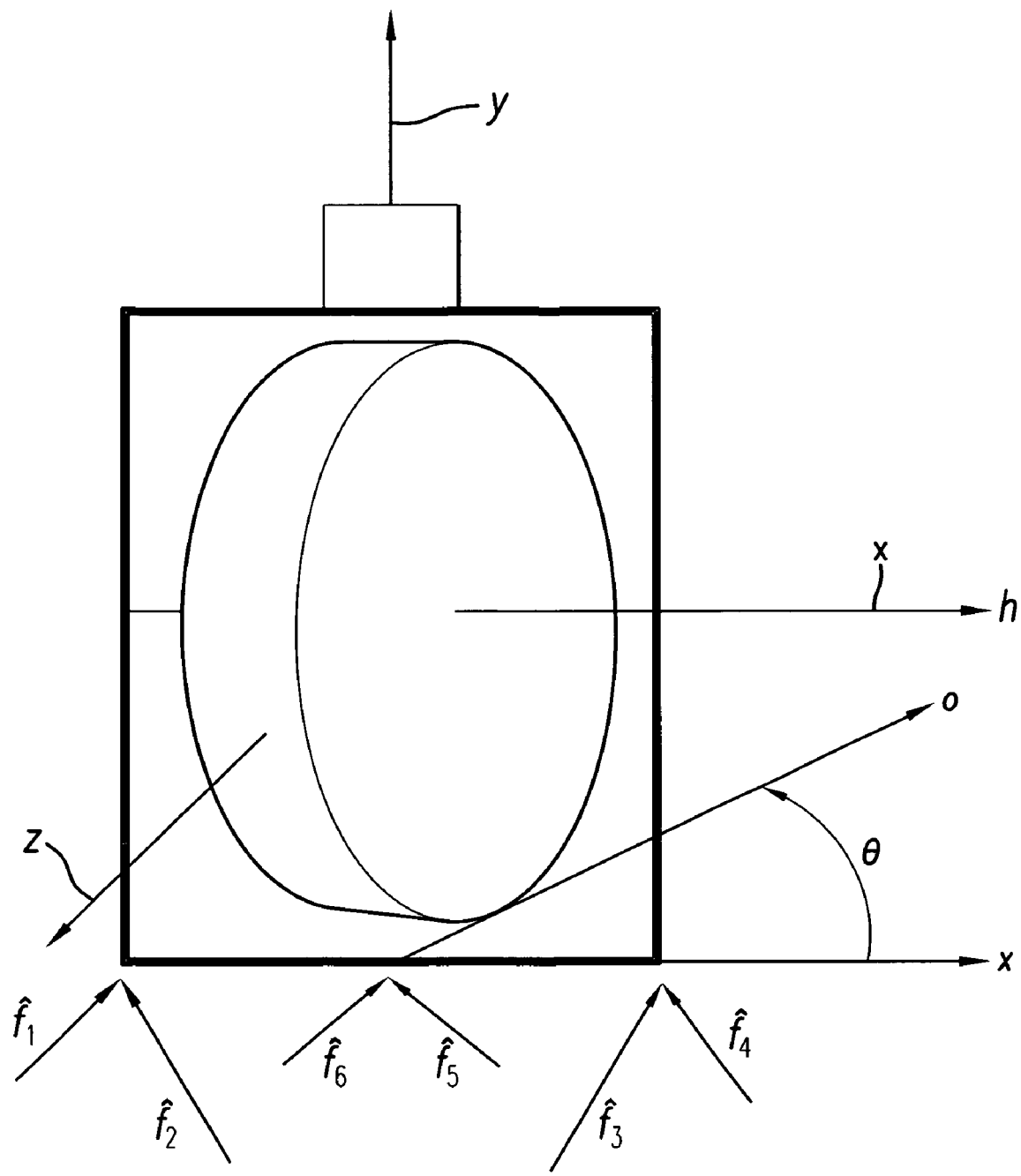
FIG. 6 is an illustration of the net forces acting on the CMG of FIG. 5 as measured by a suite of load sensors arranged in accordance with the subject invention.

Referring to FIGS. 5 and 6, the rotor assembly 122 has a rotor 123 and a motor 125 to spin the rotor 123 about the rotor axis. The gimbal assembly 124 supports the rotor assembly 22. A gimbal torque motor 127 rotates the gimbal assembly 124 about the gimbal axis "y" to generate the output torque. The gimbal assembly 124 is mounted on a Stewart platform 129, which is supported by three strut bipods 131. The DTACS 130 uses three load cells as F/T sensors 134.

The gimbal motor 127 preferably has an integral angle encoder that provides measurement of the gimbal angle. The F/T sensors 134 may be six degree of freedom F/T sensors to generate axis force and torque measurements for a feedback signal for driving the output to a desired torque as noted above. Preferably, the CMG 120 uses at least three axis of torque. Further, to measure output torque in a plane perpendicular to the gimbal axis "y", at least two measurements are utilized for feedback.

In one embodiment, not only is torque about the output axis "z" controlled directly, but other axes' torque results are also accounted for. In one embodiment, the system 110 has three CMGs in an array so that a multi-degree-of-freedom Jacobian matrix can be used to take advantage of the off-axis quantities, leading to more-precise torque than is achieved with classical CMGs. Preferably, the Jacobian matrix is the matrix of all first-order partial derivatives of a vector-valued function.

In another embodiment, each load cell is mounted on a single-axis strut, where a total of six struts (some with load cells, some without) are used to mount the CMG to the spacecraft. Preferably, the six struts provide a kinematic mount that desirably transmits only CMG mass-center acceleration and moments, not bending moments.

In general, a spacecraft may be moved in translation along three axis. As for the spacecraft's attitude, the spacecraft may be rotated about each of the three axis as well (e.g., three more degrees of freedom in attitude). Thus, in order to fully control a spacecraft's attitude, at least three CMGs are needed, one for each degree of freedom.

While the invention has been described with respect to preferred embodiments, those skilled in the art will readily appreciate that various changes and/or modifications can be made to the invention without departing from the spirit or scope of the invention as defined by the appended claims.

What is claimed is:

1. A control moment gyroscope system for delivering a target torque to a spacecraft comprising:
   a) a rotor assembly having a rotor and a motor to spin the rotor about a rotor axis;
   b) a gimbal assembly having a gimbal for supporting the rotor assembly and a gimbal torque motor to rotate the gimbal about a gimbal axis, which is normal to the rotor axis, to generate an output torque, which is normal to the rotor axis and the gimbal axis; and
   c) a control system having:
      i) a sensor for determining the output torque;
      ii) a processor operatively connected to the rotor assembly, the gimbal assembly and the sensor,
      wherein the processor requests the target torque and establishes a feedback control loop to generate a torque error signal based on the output torque for bringing the output torque within a predetermined range of the target torque; and
      iii) a memory storing calibration data, wherein the calibration data is used by the control system to correct for angle-dependent torque error when determining the measured torque.

2. A control moment gyroscope system as recited in claim 1, wherein the torque error signal is based on a difference between the target torque and the output torque.

3. A control moment gyroscope system as recited in claim 1, wherein the feedback control loop has a 90° phase margin and an infinite gain margin.

4. A control moment gyroscope system as recited in claim 1, wherein the control system has a bandwidth of at least 5 Hz and the gimbal assembly has a bandwidth of at least 10 Hz.

5. A control moment gyroscope system as recited in claim 1, wherein the sensor also measures force and the processor uses the force as a factor in the feedback control loop to offset disturbances.

6. A control moment gyroscope system as recited in claim 1, further comprising a sensor array for measuring spin rate and angle of the rotor for calibrating the sensor.

7. A control moment gyroscope system as recited in claim 1, wherein the gimbal includes a six-axis force/torque sensor.

8. A control moment gyroscope system as recited in claim 7, wherein the six-axis force/torque sensor includes at least three load cells.

9. A control moment gyroscope array for a spacecraft comprising:
   at least three control moment gyroscopes (CMGs), each control moment gyroscope (CMG) mounted to the spacecraft and generating an output torque vector that includes components in three linearly independent directions;
   a sensor for reading the output torque vector of each CMG to determine a respective measured torque vector; and
   a controller for commanding the at least three CMGs to provide a desired torque vector as a vector sum of the at least three CMGs and receiving the measured torque vectors, wherein the controller is operative to determine a vector torque error signal based on the measured torque vector and the desired torque vector such that the torque vector error signal is used to make the output torque vector substantially equal to the desired torque vector, wherein predetermined calibration data is used by the control system to correct for angle-dependent torque error when determining the measured torque.

10. A control moment gyroscope array as recited in claim 9, wherein the at least three CMGs is four CMGs.

11. A method for commanding a control moment gyroscope comprising the steps of:
    determining an angle-dependent torque error associated with the control moment gyroscope;
    adjusting a command torque by the angle-dependent torque error;
    providing the adjusted command torque to the control moment gyroscope;
    monitoring an output torque of the control moment gyroscope; and
    providing feedback to the control moment gyroscope based on the adjusted command torque and the output torque.

12. A method as recited in claim 11, further comprising the steps of:
    determining a constant disturbance torque associated with the control moment gyroscope; and
    adjusting the command torque by the constant disturbance torque.

13. A method as recited in claim 11, further comprising the step of filtering data representative of the output torque.

14. A method as recited in claim 11, further comprising the step of solving for fit coefficients in the following Fourier series expansion:

$$\tau_{bias}(\theta) \approx \alpha_0 + \alpha_1 \cos\theta + \alpha_2 \sin\theta + \alpha_3 \cos 2\theta + \alpha_4 \sin 2\theta$$

in order to adjust the command torque.

15. A method as recited in claim 11, wherein a system using the control moment gyroscope responds with a time constant T of $$T = \frac{I_{g,eff}}{K_t K_p h}$$

and further comprising the step of selecting the gain $K_p$ on order to accommodate a settling-time requirement.

* * * * *